(12) United States Patent
Sagar

(10) Patent No.: US 6,873,841 B1
(45) Date of Patent: Mar. 29, 2005

(54) SHARED ADDRESS-DATA SERVICE FOR PERSONAL CE EQUIPMENT

(75) Inventor: Richard Bryan Sagar, Santa Clara, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/464,866

(22) Filed: Dec. 16, 1999

(51) Int. Cl.$^7$ .................................................. H04M 3/42
(52) U.S. Cl. ........................... 455/414.4; 455/412.1; 455/414.1; 379/88.18; 707/4
(58) Field of Search ..................... 455/412.1, 414.1–4, 455/432.1, 436.1, 435.1, 556.2; 379/67.1, 88.17, 88.18, 88.25, 88.27; 707/3, 4

(56) References Cited

U.S. PATENT DOCUMENTS

| | | | | |
|---|---|---|---|---|
| 5,440,559 A | * | 8/1995 | Gaskill ...................... 340/10.2 |
| 5,564,070 A | * | 10/1996 | Want et al. ................ 370/341 |
| 5,588,148 A | | 12/1996 | Landis et al. ............... 395/601 |
| 5,647,002 A | * | 7/1997 | Brunson ..................... 709/206 |
| 5,729,735 A | * | 3/1998 | Meyering ................... 707/10 |
| 5,845,282 A | * | 12/1998 | Alley et al. .................. 707/10 |
| 5,859,898 A | * | 1/1999 | Checco .................... 379/88.01 |
| 5,862,321 A | * | 1/1999 | Lamming et al. ........... 358/403 |
| 5,870,759 A | * | 2/1999 | Bauer et al. ................ 707/201 |
| 5,884,262 A | * | 3/1999 | Wise et al. ................ 379/67.1 |
| 5,961,590 A | * | 10/1999 | Mendez et al. ............. 709/206 |
| 6,023,708 A | * | 2/2000 | Mendez et al. ............. 707/203 |
| 6,034,621 A | * | 3/2000 | Kaufman ................... 340/7.21 |
| 6,088,730 A | * | 7/2000 | Kato et al. .................. 455/556 |
| 6,151,606 A | * | 11/2000 | Mendez ..................... 707/201 |
| 6,212,550 B1 | * | 4/2001 | Segur ........................ 709/206 |
| 6,219,694 B1 | * | 4/2001 | Lazaridis et al. ........... 455/556 |
| 6,233,452 B1 | * | 5/2001 | Nishino ...................... 455/435 |
| 6,308,201 B1 | * | 10/2001 | Pivowar et al. ............. 709/214 |
| 6,353,661 B1 | * | 3/2002 | Bailey, III ................ 379/88.17 |

FOREIGN PATENT DOCUMENTS

| | | |
|---|---|---|
| GB | 2325064 A | 11/1998 |
| WO | 97/32251 | 9/1997 |

OTHER PUBLICATIONS

Microsoft Windows, "MY Briefcase" Help description, Microsoft Corporation copyrighted 1983.*

* cited by examiner

*Primary Examiner*—William Trost
*Assistant Examiner*—Stephen D'Agosta
(74) *Attorney, Agent, or Firm*—Dicran Halajian

(57) ABSTRACT

The user is enabled to upload, to a server on the Internet, information from a first contact data base in a first communications apparatus. The server manipulates the uploaded information and extracts or converts the format of the records for a second contact data base of a second communications apparatus.

3 Claims, 2 Drawing Sheets

"Col1 Label", "Col2 Label", "Col3 Label",...
"Row1 Data1", "Row1 Data2", "Row1 Data3",...
"Row2 Data1", "Row2 Data2", "Row2 Data3",...

FIG. 2

| Col1 Label | Col2 Label | Col3 Label |
|---|---|---|
| Row1 Data1 | Row1 Data2 | Row1 Data3 |
| Row2 Data1 | Row2 Data2 | Row2 Data3 |

SHARED ADDRESS-DATA SERVICE FOR PERSONAL CE EQUIPMENT

FIELD OF THE INVENTION

The invention relates to communication devices such as mobile phones and PDA's. The invention also relates to sharing data among multiple consumer electronics (CE) devices.

BACKGROUND OF THE INVENTION

Information processing systems for consumers have become a commodity. Desktop PC's, lap-tops, palm-tops and other personal digital assistants (PDA's) have been becoming household items. Similarly, mobile phones and pagers have become widespread. Some or all of these devices have one or more functionalities in common. For example, a person's PC has a database with email addresses and other contact information for communication purposes that are useful to have available in the programmable address book of a mobile phone or PDA and vice versa. As another example, consider a database of bookmarks in the browser of a first Internet-enabled device that are desirable to have available, in its entirety or in part, on a second Internet enabled device with browser capabilities. One way to accomplish is this to have the user manually program or otherwise manually enter the database, or a desired portion thereof, into the second device. This is a tedious task, especially when the alphanumeric keyboard functionality is minimized as it typically is on PDA'sand other handhelds.

U.S. Pat. No. 5,940,752, herein incorporated by reference, relates to a cellular telephone as a portable information storage and retrieval device for data stored in and transmitted to the telephone from a personal computer. The computer and associated input devices, such as a keyboard, a mouse and a screen, local and network databases and interfaces to personal organizer software all allow ease of input and maintenance of the information. A communications path between the personal computer and the telephone terminal is provided for periodically transferring the information from the personal computer to the telephone terminal. The cellular telephone is thus provided access to information such as a dialing directory, appointments, reminders, etc. that is easily inputted and conveniently stored in the cellular telephone.

SUMMARY OF THE INVENTION

A drawback of the known system is that it needs direct compatibility of the database in the PC and the database in the telephone, regarding data format and encoding. This means that the PC and telephone should use the same format. Further it requires the telephone and the PC to be directly connected to one another via a telephone line.

It is an object of the invention, to provide a more universal system and method that has advantages over the system and method of the known system.

To this end the invention provides a method of transferring or enabling to transfer information in a first database of a first electronic apparatus to a second apparatus. The information is for operational use of both first and second apparatus. According to the method the information is uploaded from the first apparatus to a server, preferably via the Internet. The uploaded information is manipulated at the server. The manipulation comprises, for example, filtering and format conversion. The manipulated information is downloaded from the server, e.g., via the Internet, to the second apparatus for storage in a second data base of the second apparatus. Preferably, the first apparatus has a first communications capability and the second apparatus has a second communications capability. For example, the first apparatus comprises a PDA with an email capability or a pager, and the second apparatus comprises a mobile phone or a wired phone. The first and second data bases relate to first and second communications directories, with, e.g., names of persons, their dates of birth, their telephone and fax numbers, their street addresses, their email addresses, etc. In another example, the first and second apparatus comprises first and second PDA's or first and second mobile phones that use such contact data bases of different formats.

Using the Internet as the node to which the data is uploaded has several advantages over the prior art. Note that an Internet service provider or telephony service provider could offer a facility according to the invention in order to improve their quality of service.

A first advantage relates to distribution to multiple clients. Once the data has been uploaded to the Internet server it can more easily and selectively be downloaded to multiple clients, with the necessary conversion to different formats. Moreover, the formats for the various clients can be changed as time goes on, without affecting the software on the original device. It is easier because the need to connect the source device to each of the clients is removed. The Internet server can store a copy of the data for an indefinite period, as well as track which clients have had an updated copy of the data. Therefore next time a client requests the data, i.e., next time it connects to the Internet, the appropriate update is sent. This reduces the likelihood that the user "forgets" to update the data on one particular client, as could be the case if they had to connect the original device to each of the clients manually: a labor intensive task which would only be done for the purpose of updating. The chance of users using obsolete data is therefore reduced.

Another advantage relates to minimizing overhead of device storage, power and maintenance. The process of converting the data from one format to another has a software overhead for the necessary conversion algorithms, processing power overhead for the conversion and storage overhead for the resulting output data file. One might imagine that for each output format supported the client has to double the available space on the device, in order to store the outputted version of the database (temporarily) until the intended recipient is connected. There is an additional problem with the originating device performing the conversion. As indicated earlier, most devices use a proprietary format for the storage of data internally, as they can in this way optimize the format of the data to their software. This could mean that the memory required in the originator increases proportionate to the number of client devices that the manufacturer wishes to support and provide data format conversion. Because most devices use mask-programmed read only memory (ROM) for program storage (as it is none-volatile, low cost and easy to mass produce), it would mean the list of conversion formats would be fixed to those that existed at the time that the source device was designed. The alternative would be to increase the cost and software complexity of the device, to allow for storage of the whole code, or at least extensions to it, to be stored in some form of re-writeable storage (EPROM or FLASH). Whenever software is delivered to an end user, there is a per user cost for the maintenance. Firstly, the cost and time overhead for delivering the software to the client and secondly, the need to install the software on the clients machine. By performing the conversion of the data on the server, only one piece of software needs to be updated. This means that all users use the same software version and same conversion algorithms, reducing versioning problems and issues with support.

Yet another advantage relates to the simplicity of connection. It is not always possibly to directly connect two pieces of equipment together. Consider a cellular phone. Often these devices have a hardware interface at the base of the handset, but these interfaces typically have proprietary data protocol and electrical characteristics. For a PDA or PC to download data to one or more cellular phone, a special cable would need to be purchased. For each additional client, it is conceivable that more cables would be required. The use of the Internet removes this problem. It is now becoming common for devices to support connection to the Internet; via CDPD data over cellular radio frequencies, modem connection or Ethernet. If each device is already capable of connecting to the Internet, for general communication purposes, then the two devices effectively have a connection, so the need for additional cables between devices is removed. Any specialized hardware that is required becomes a shared resource connected to the server.

DETAILED DESCRIPTION OF THE DRAWINGS

The invention is described in further detail by way of example and with reference to the accompanying drawing, wherein:

FIG. 2 is an example of a comma separated variable (CSV) format; and

FIG. 3 is an example of a table created based on the information in the CSV format of FIG. 2.

Throughout the Figures, same reference numerals indicate similar or corresponding features.

PREFERRED EMBODIMENTS

Figure 1:
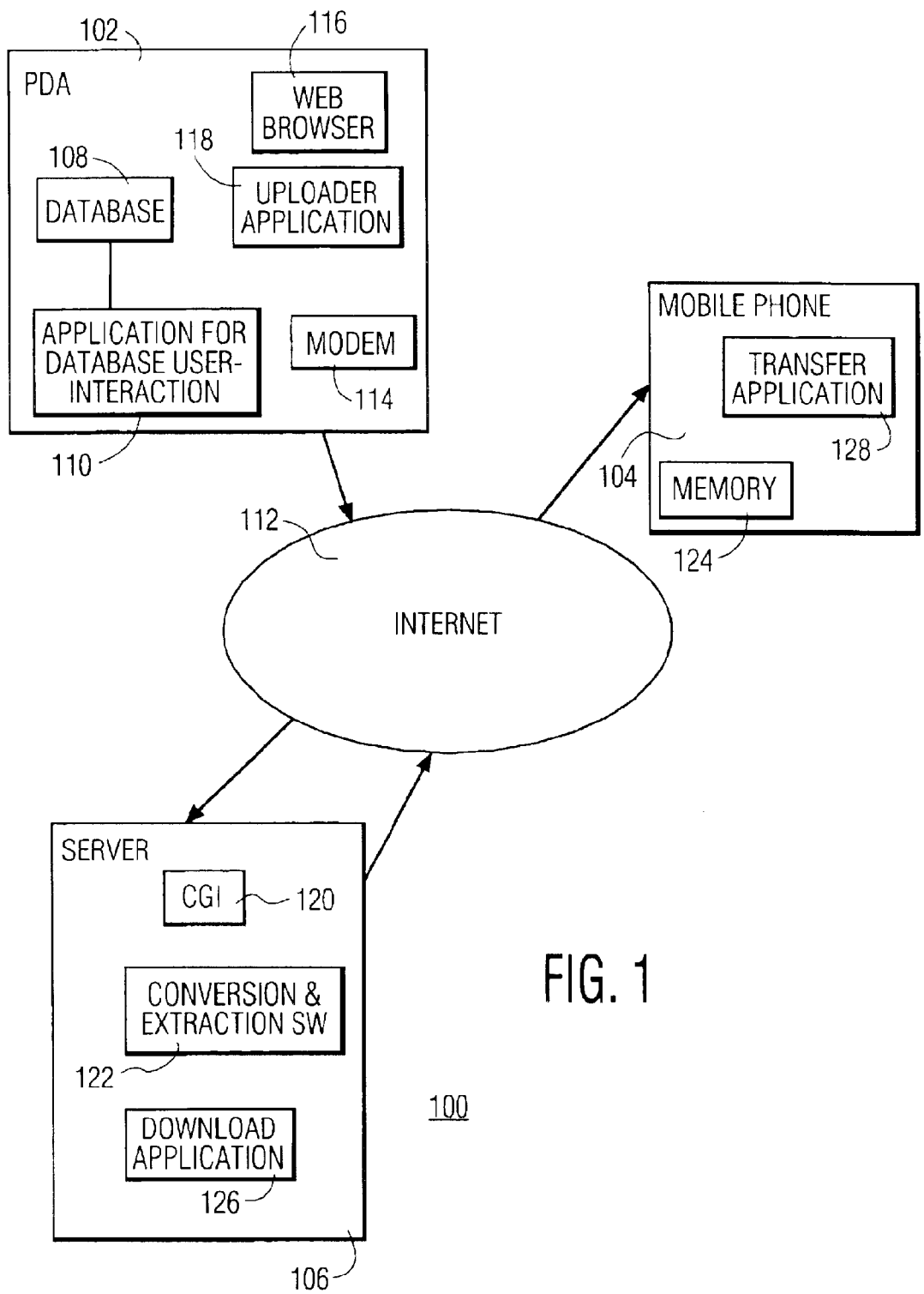
FIG. 1 is a block diagram of a system of the invention.

As an example, the invention provides an Internet service that allows the contents of a person's PDA's contact database to be uploaded to a server on the Internet. The server processes the data in order to extract phone numbers from the database. The phone number data is then transmitted, via the wireless cellular phone network, to a mobile phone, e.g., of that same person. The mobile phone is equipped with special software, which allows it to store those numbers transmitted over the cellular network into the standard "memory" or "speed dial" numbers of the phone. Such remote programming of a mobile phone is known, for example, from U.S. Pat. No. 5,940,752 mentioned above, and U.S. Pat. No. 4,788,720, U.S. Pat. No. 5,297,191 and U.S. Pat. No. 5,297,192, all incorporated herein by reference The database that provided the numbers is, e.g., the database of the "Contacts" application on the person's "Nino"™ PDA from Philips Electronics. The benefit to the owner of these two products is time-saving and accuracy: the owner does not have to manually replicate all the numbers from the database onto the phone-via its "hunt&peck" keyboard. Neither of the devices is required to add any additional hardware, i.e., no additional port need be added to the phone, no extra cables are needed for the Nino. All of the additional functionality is via software and the use of a supported service, which runs under, e.g., the "SmartConnect"$^{SM}$ service of Philips Electronics (see U.S. Ser. No. 09/160,490 mentioned further below).

Below is an example of a scenario illustrating the sharing of personal settings of multiple devices. Debbie recently bought a PDA, e.g., the Nino of Philips Electronics, as she heard it would meet her requirements for storing contact information of her friends and family. One of the reasons she chose a PDA (rather than storing the details on her PC) is that she travels regularly, being an accountant. Because she travels so much, Debbie has decided that a mobile phone would be useful as well. While in the process of buying a mobile phone, she notices that the phone's manual mentions that same SmartConnect service that she remembered seeing in the documentation for her Nino. On further investigation, she discovers that if she chooses the Philips mobile, she can use SmartConnect to transfer the contact information in her Nino directly onto the phone. When Debbie gets home, she connects her Nino to the Internet, using a standard modem. She selects the SmartConnect item on the Start menu, which opens the web browser at the Philips' SmartConnect website. The web page that she sees is tailored to her Nino, as SmartConnect is able to detect that Debbie has connected through the Nino browser. One of the featured services on the page, is Backup to Web, which allows contact details on the Nino to be transferred over the Internet to SmartConnect.

Because Debbie has also registered the purchase of a mobile phone with SmartConnect, she is presented with an option "Mirror to Phone". Debbie selects this option and a page is presented to her that simply says: "Next time you press the SmartConnect button on your mobile phone, the numbers from your Nino contact database will be transferred to its speed dial memories." Debbie's phone is still in the middle of it's initial charging period, as she only bought it today, but as soon as that has finished she turns the phone on and presses the SmartConnect button. The phone informs her that her speed dial numbers are being updated. When Debbie then checks the speed dial numbers, they do indeed correspond to those on her Nino.

FIG. 1 is a block diagram of a system 100 in the invention. System 100 comprises a PDA 102, a mobile phone 104 and a server 106. PDA 102 has a database 108 comprising contact information, such as email addresses, telephone numbers, page numbers, etc. The user has entered the data into PDA 102 in this example through a suitable user-interface (not shown) via a software application 110 that enables user-interaction with database 108 for entering new data and for retrieval of stored data. Database 108 uses a file format specific to PDA 102 for efficiency reasons. The format of database 108 is preferably customizable by the user. For example, the user can specify or modify the labels or identifiers used for the columns in the database's table, and specify what the data types are for the columns in the table (e.g., text, digits, phone/fax number, etc.). PDA 102 has access to the Internet 112, e.g., via a modem 114 or other network interface card.

Modem 114 is preferably a wireless modem, for example, a Minstrel or a Ricochet. The Minstrel marketed by Novatel Wireless is a two-way wireless modem for a PDA that lets the user browse the Web and receive email, among other things. In a more general sense, a wireless modem like the Minstrel or Ricochet provides the handheld device with an IP address that can be used by any type of application that uses the Internet for communication (within limitations of throughput, latency and coverage). The Minstrel uses a technology referred to as Cellular Digital Packet Data (CDPD) that is supported by the cellular service providers. Web surfing is limited to a CDPD speed cap of 19.2-kbps. The Ricochet from Metricom has a faster connect rate, in the 28.8K-bps range, but it is supported in only three metropolitan centers (the San Francisco Bay area, Seattle and Washington). The information communicated is limited in size. The data rate in this example is approximately 9,600 Baud.

A web browser 116 or e-mail application is also provided on PDA 102. When the user connects to the Internet 112 a background process 118 (which is referred to herein as the "uploader") detects that the connection is made. Once the connection to the Internet 112 exists uploader 118 connects to a predetermined Internet site of server 106. Once connected to the site, uploader 118 sends a copy of database file 108 into storage on server 106 by standard Internet protocols (HTTP POST). In some cases the user may have multiple database files, all of which he/she may want to transfer. Uploader 118 accommodates this feature. A "preferences" graphical user-interface on uploader 118 allows the user to specify, for example, the location of the site on the Internet (i.e., the URL) to which database files are uploaded; the selection of database files to upload from the PDA to the Internet; and the frequency at which the uploads are performed.

Preferably, uploader 118 makes use of PDA's 102 built-in web browser 116 to perform the uploading of the database information to the Internet 112. By invoking an existing web browser on PDA 102, via a file created locally by uploader 118, the size of uploader application 118 can be minimized. Therefore it is required that web browser 116 support the following features. Browser 116 can be invoked from another application on PDA 102. The name of an HTML file can be specified that browser 116 is to open. Browser 116 can open HTML files stored on the local machine, i.e., PDA 102 in this example, in addition to documents downloaded from the Internet 112. Browser 116 supports HTML "forms" and, more specifically, forms that support the <input file . . . > tag. Browser 116 can optionally support JavaScript, which allows the form to be automatically POSTed to the Internet site. This is desirable if the submission of the database 108 is to occur without user intervention.

If browser 116 on PDA 102 does not implement the above features, then uploader application 118 is to implement its own subset of HTTP, sufficient to transfer database file 108 over the Internet 112 without the support of browser 116. The protocols for HTTP can be downloaded from the w3c consortium website at http://www.w3c.org. Specifically needed are HTTP GET, HTTP POST, and MIME encoding.

In order to post database file 108 from PDA 102 to the Internet 116, application 118 on PDA 102 connects to server 106, then uses the POST protocol to specify the URL of the common gateway interface (CGI) program 120, which receives database file 108. As known, the CGI is part of the Web's http protocol. When CGI 120 is invoked, data is passed to it as part of the POST. This data preferably includes the name of database file 108, database file 108 itself, a user identifier and a password or other means to validate the user.

When sending files over HTTP, the content is usually encoded using the base64 encoding scheme. The CGI will therefore have to initially decode the base64 version of database 108 to retrieve the original database file 108. This is a common requirement and modules are commercially or freely available that handle most languages used for CGIs (Perl, C, C++, Java). Server 106 has a program 122 that extracts the information from the copy of database file 108 received in order to pass it to mobile phone 104.

The following aspects need to be considered. The database file is probably encoded in a proprietary format that was optimized for use on PDA 102. A number of fields in the original database file 108 will not be useful on mobile phone 104, so may need to be removed in the version that is passed to mobile phone 104. The number of entries in database 108 may exceed the size of a memory 124 available on mobile phone 104. Typically, memory 124 is more limited than that of PDA 102.

If database file 108 is encoded in a proprietary format, the file format is to be converted am into a useful intermediate format that allows the data to be easily manipulated by web server 106. This might typically be the comma-separated-variable (CSV) format, which is often used to pass data between databases that do not use a common file format. FIG. 2 gives a self-explanatory example 200 of a CSV file format. FIG. 3 gives a table 300 which is created based on the data of example 200.

However, for some languages or servers, it may not be necessary to create an intermediate file format. Server 106 might just store the data from database file 108 directly into memory in the form of an object hierarchy. For simplicity, these two options will be referred to as the "intermediate format". In either case, the exact format used on server 106 is not important, except that application 122 itself is able to separate the records in database 108 and the individual fields in each record.

From the intermediate format, server application 122 can select which elements of database 108 to transfer to mobile phone 104. Using the data in table 300 as an example, imagine that only the data in the first and third columns need to be transferred to mobile phone 104. For example, the second column might be a map, allowing directions to the address of the contact to be stored visually. For a mobile phone with a text-only display, it would not be useful to have the image in memory 124, as it could not be displayed.

To allow the user of the database to select which columns need to be transferred to mobile phone 104, the following is recommended. Subsequent to the transfer of database 108 to server 106, application 122 checks to see if this database has been uploaded in the past. For a database that has not been uploaded before, the user is provided with a list of each field (shown on a display of PDA 102), by label and prompted to indicate which fields need to be transferred. A separate checkbox, one for each database field, is presented on-screen and the user checks appropriate boxes to indicate the fields that need to be transferred to mobile phone 104. On submission of the information by the user to server application 122, the latter stores the user's selection in a way that allows it to be recalled for the specific database 108, when database 108 is uploaded to server 106 again, some time later. For either a new or an existing database, the contents are then stored on server 106, as outlined above, in the Intermediate Format, while the data is manipulated and transferred to mobile phone 104.

Once database 108 has been filtered to only contain information appropriate to mobile phone 104, the data must be transferred to mobile phone 104 to update the speed dial presets in memory 124. Server 106 comprises a download software application 126 for control of the download to phone 104. Phone 104 comprises an application 128 for receiving the data from server 106 and for transfer of the data into memory 124. Methods to perform the transfer of data to a mobile phone are discussed in the prior art, see, e.g., U.S. Pat. No. 5,940,752 mentioned above.

A further aspect of the invention relates to conversion for multiple clients. Because server application 122 performs the conversion of PDA database 108 to the format required by mobile phone 104, it is possible to allow different combinations of PDA and mobile phones to cooperate. The appropriate converter can be associated with the particular user and type of PDA 102, such that when database 108 is uploaded to server 106, the format is automatically converted to the specific format that the particular user needs. Additionally, a user with multiple mobile phones should be able to list each phone via a configuration interface for the server application. This means that once the database has been uploaded to server 106, server application 122 can send appropriately converted versions of the database to each of the users mobile phones.

Within the context of the above, the following patent documents are incorporated herein by reference:

U.S. Ser. No. 09/160,490 filed 9/25/98 for Adrian Turner, Simon Pearce, David Eves and Allan Timms for CUSTOMIZED UPGRADING OF INTERNET-ENABLED DEVICES BASED ON USER-PROFILE. This document relates to a server system that maintains a profile of a particular end-user of CE network-enabled equipment as well as a database of new technical features for this type of equipment. If there is a match between the profile of the user and a new feature, and if the user has indicated he or she would like to obtain information about updates of sales offers, the user gets notified via the network of the option to obtain the feature, e.g., via downloading over the Internet.

U.S. Ser. No. 09/433,257 filed 10/27/99 for Joost Kemink and Richard Sagar for PDA HAS WIRELESS MODEM FOR REMOTE CONTROL VIA THE INTERNET. This document relates to combining a personal digital assistant (PDA) with a wireless modem to enable remote control of CE equipment via the Internet ad a local home server.

U.S. Ser. No. 09/311,128 filed 5/13/99 for Joost Kemink for INTERNTET-BASED SERVICE FOR UPDATING A PROGRAMMABLE CONTROL DEVICE. This document relates to an Internet-based service for updating programmable control devices. An Internet site contains links to appliance dependent control and feature option information, which can be downloaded to the programmable control device as a graphic user interface.

What is claimed is:

1. A method for transferring data in a database of a first mobile terminal to one or more second mobile terminals, comprising:

providing a common server accessible to a first mobile terminal and a corresponding second mobile terminal, the terminals being remote from each other and the server, the first mobile terminal having at least a first application and associated first database for use in the first mobile terminal, and the second mobile terminal having at least a second application and associated second database for use in the second mobile terminal;

enabling the upload of data from the first applications first database to the common server;

associating the data with a particular user;

determining a format required by the particular user;

converting the uploaded data to conform to the format;

the server determining which from a plurality of corresponding and non-corresponding mobile terminals is a corresponding second mobile terminal and selectively transferring the converted data automatically into the second database for use by the second application;

wherein the first database includes a telephone directory;

wherein the second database includes a telephone directory; and wherein the manipulated information includes one or more telephone numbers automatically retrievable by the second apparatus to initiate a telephone call from the second apparatus.

2. A system comprising:

a server enabled for access by a plurality of sets of corresponding apparatuses the apparatuses being remote from the server and from each other, each set of corresponding apparatuses being for a specific one of a plurality of users of the sets;

the server enabled to receive data from a first apparatus in a set;

the server enabled to manipulate the data so that it is usable by a program application in a corresponding second apparatus of the set;

the server enabled to selectively transfer the manipulated data to the one or more second apparatuses in the set;

wherein:

the first apparatus has a first communications capability based on a first data base;

the second apparatus has a second communications capability based on a second data base;

the first data base relates to a first communications directory;

the second data base relates to a second communications directory;

wherein the first database includes a telephone directory; and wherein the manipulated information includes one or more telephone numbers automatically retrievable by the second apparatus to initiate a telephone call from the second apparatus.

3. A system comprising:

a server enabled for access by a plurality of sets of corresponding apparatuses the apparatuses being remote from the server and from each other, each set of corresponding apparatuses being for a specific one of a plurality of users of the sets;

the server enabled to receive data from a first apparatus in a set;

the server enabled to manipulate the data so that it is usable by a program application in a corresponding second apparatus of the set;

the server enabled to selectively transfer the manipulated data to the one or more second apparatuses in the set;

wherein:

the first apparatus has a first communications capability based on a first data base;

the second apparatus has a second communications capability based on a second data base;

the first data base relates to a first communications directory;

the second data base relates to a second communications directory;

wherein the second database includes a telephone directory; and wherein the manipulated information includes one or more telephone numbers automatically retrievable by the second apparatus to initiate a telephone call from the second apparatus.

* * * * *